United States Patent [19]
Morris

[11] Patent Number: 5,853,851
[45] Date of Patent: Dec. 29, 1998

[54] PAVEMENT MARKING TAPE COMPRISING ACID-RESISTANT MICROSPHERES

[75] Inventor: Geoffrey P. Morris, White Bear Lake, Minn.

[73] Assignee: Minnesota Mining and Manufacturing Company, St. Paul, Minn.

[21] Appl. No.: 965,337

[22] Filed: Nov. 6, 1997

Related U.S. Application Data

[62] Division of Ser. No. 704,171, Aug. 28, 1996, Pat. No. 5,716,706, which is a continuation of Ser. No. 423,890, Apr. 18, 1995, abandoned.

[51] Int. Cl.$^6$ ....................................................... B32B 5/02
[52] U.S. Cl. ............................................ 428/149; 428/325
[58] Field of Search ................................. 428/40.2, 149, 428/325, 40.4, 402, 41.6

[56] References Cited

U.S. PATENT DOCUMENTS

| | | | |
|---|---|---|---|
| 2,150,694 | 3/1939 | Morey | 106/36.1 |
| 2,206,081 | 7/1940 | Eberlin | 106/36.1 |
| 2,354,018 | 7/1944 | Heltzer et al. | 88/82 |
| 2,430,540 | 11/1947 | Sun et al. | 106/47 |
| 2,610,922 | 9/1952 | Beck | 106/54 |
| 2,701,208 | 2/1955 | Blau | 106/47 |
| 2,790,723 | 4/1957 | Stradley et al. | 106/47 |
| 2,853,393 | 9/1958 | Beck et al. | 106/47 |
| 2,939,797 | 6/1960 | Rindone | 106/47 |
| 2,963,378 | 12/1960 | Palmquist et al. | 106/193 |
| 2,992,122 | 7/1961 | Beck et al. | 106/53 |
| 3,022,182 | 2/1962 | Cleek et al. | 106/52 |
| 3,119,703 | 1/1964 | Cleek et al. | 106/47 |
| 3,198,641 | 8/1965 | Searight et al. | 106/47 |
| 3,228,897 | 1/1966 | Nellessen | 260/16 |
| 3,294,558 | 12/1966 | Searight et al. | 106/54 |
| 3,294,559 | 12/1966 | Searight et al. | 106/54 |
| 3,306,757 | 2/1967 | d'Adrien | 106/54 |
| 3,410,185 | 11/1968 | Harrington | 94/22 |
| 3,468,681 | 9/1969 | Jaupain | 106/47 |
| 3,493,403 | 2/1970 | Tung et al. | 106/47 |
| 3,547,517 | 12/1970 | Searight et al. | 350/105 |
| 3,560,074 | 2/1971 | Searight et al. | 350/105 |
| 3,563,771 | 2/1971 | Tung | 106/47 |
| 3,915,771 | 10/1975 | Gatzke et al. | 156/71 |
| 3,946,130 | 3/1976 | Tung et al. | 428/325 |
| 4,082,427 | 4/1978 | Nakashima | 350/105 |
| 4,141,742 | 2/1979 | Nakajima | 106/47 R |
| 4,179,300 | 12/1979 | Sagara | 106/47 Q |
| 4,192,576 | 3/1980 | Tung et al. | 350/105 |
| 4,248,932 | 2/1981 | Tung et al. | 428/325 |
| 4,367,919 | 1/1983 | Tung et al. | 350/105 |
| 4,584,279 | 4/1986 | Grabowski et al. | 501/78 |
| 5,227,221 | 7/1993 | Hedblom | 428/172 |
| 5,268,789 | 12/1993 | Bradshaw | 359/534 |
| 5,286,682 | 2/1994 | Jacobs et al. | 501/34 |
| 5,310,278 | 5/1994 | Kaczmarczik et al. | 404/14 |

FOREIGN PATENT DOCUMENTS 57-45691  9/1982  Japan .

OTHER PUBLICATIONS

Chemical Abstracts, vol. 106, No. 2, Abstract No. 8633m, p. 223, 12 Jan. 1987, Columbus, OH, & JP A 05 609 244, 28 Feb. 1981.

*Primary Examiner*—Timothy M. Speer
*Attorney, Agent, or Firm*—Robert H. Jordan

[57] ABSTRACT

An acid-resistant glass article is provided comprising: about 25–45 wt-% $SiO_2$; about 20–35 wt-% $TiO_2$; less than about 5 wt-% $B_2O_3$; about 15–40 wt-% of an alkaline earth modifier selected from the group consisting of BaO, SrO, and mixtures thereof; and no greater than about 25 wt-% of an alkali-metal oxide selected from the group consisting of $Na_2O$, $K_2O$, and mixtures thereof. The glass article is preferably in the form of a microsphere that is adapted for use as a retroreflective element in pavement markings.

19 Claims, No Drawings

PAVEMENT MARKING TAPE COMPRISING ACID-RESISTANT MICROSPHERES

Cross-Reference To Related Applications

This application is a division of U.S. application Ser. No. 08/704,171, filed Aug. 28, 1996, now U.S. Pat. No. 5,716,706, which was a continuation of U.S. application Ser. No. 08/423,890, filed Apr. 18, 1995, now abandoned.

BACKGROUND OF THE INVENTION

Pavement markings of various forms (e.g., paints, tapes, and individually mounted articles) are well known to guide and direct motorists as they travel along a highway. During the daytime, the markings, which are typically of selected distinctive color(s), may be sufficiently visible under ambient light to effectively signal and guide a motorist. At night, however, especially when the primary source of illumination is the motorist's vehicle headlights, the colors of the markings are generally insufficient to adequately guide a motorist. For this reason, pavement markings with retroreflective properties have been employed.

Such pavement markings typically include glass microspheres to provide retroreflective properties. However, glass microspheres embedded in the surface of painted lines and other pavement markings to serve as retroreflective elements are subjected to extremely destructive conditions. This can result from, for example, the weight of vehicles. Such conditions tend to eventually crush and/or abrade the microspheres, thereby reducing or taking away the transmission of light that is necessary for retroreflection.

Glass microspheres in pavement markings are also subject to attack by corrosive agents sometimes present in the air, such as acids formed by various emissions from automobiles, furnaces, industrial plants, etc. Such attack can cause the microspheres to become hazy and lose transparency, which also reduces or takes away their reflectivity. Conventional glass microspheres having desirable resistance to crushing, abrading, and hazing can be difficult to consistently manufacture. This is because a number of the components are volatile and tend to be released from the glass melt, thereby making it difficult to control the refractive index of the glass, for example.

Furthermore, such compositions use components, e.g., sodium fluoride, that create hazardous emissions from the glass melt, e.g., HF and $SiF_4$. Such components can also promote devitrification, which limits the size of glass articles that can be produced. Thus, what is needed are glass articles, particularly glass microspheres, that are acid resistant, crush resistant, and that are easier and safer to manufacture.

SUMMARY OF THE INVENTION

The present invention provides glass articles, particularly microspheres, which combine high durability, a desirable index of refraction (e.g., about 1.6–1.9 and preferably about 1.75–1.85), and good resistance to acidic chemical agents. The term "microsphere" or "spherical" is used herein for rounded unitary glass elements used for retroreflection whether or not the elements are perfect spheres.

One aspect of the increased durability of the glass articles, e.g., microspheres is an improved crushing strength, i.e., crush resistance. As measured by a test described in the working examples, microspheres of the invention have a crush resistance of at least about 3500 $kg/cm^2$, and preferably at least about 5000 $kg/cm^2$. Another aspect of the increased durability is an improved acid resistance. As measured by a test described in the working examples, no more than about 20% of a set of microspheres have reduced transparency as a result of exposure to acid. That is, no more than about 20% (by number) show any visible haziness, frostiness, or opacity, as a result of 120 hours in a 1 volume-% concentrated sulfuric acid solution. Thus, as used herein, an "acid-resistant" glass composition is one that can be exposed to 1 volume-% $H_2SO_4$ for 120 hours with no more than about 20% of a sample of microspheres having the claimed glass composition displaying reduced transparency.

Preferably, the glass articles are visibly transparent (i.e., they transmit a sufficient amount of light such that they are sufficiently retroreflective for pavement marking applications) and contain no more than about 5 wt-% scattered crystallinity. The glass articles can be of any size and shape and can be used in a variety of applications. For microspheres that are suitable for use in pavement markings, they are preferably less than about 2 mm in diameter. The glass microspheres of the present invention can be used in patterned pavement marking tapes. Preferably, however, they are used in flat pavement marking tapes.

The components of the glass articles of the present invention are as follows: about 25–45 wt-% SiO2; about 20–35 wt-% $TiO_2$; less than about 5 wt-% $B_2O_3$; about 15–40 wt-% of an alkaline earth modifier selected from the group consisting of BaO, SrO, and mixtures thereof; and no greater than about 25 wt-% of an alkali metal oxide selected from the group consisting of $Na_2O$, $K_2O$, and mixtures thereof. The ratio of the amount of $SiO_2$ to the total amount of alkaline earth modifier plus alkali metal oxide is greater than about 0.7. Such compositions provide acid-resistant glass. For significant acid resistance, ease of melting, and optimum refractive index (i.e., about 1.75–1.85), the glass compositions of the present invention include about 30–35 wt-% $SiO_2$, about 25–35 wt-% $TiO_2$, less than about 1 wt-% $B_2O_3$, about 25–35 wt-% of BaO and/or SrO, and about 4–8 wt-% of $Na_2O$ and/or $K_2O$.

As is common in the glass art, the components are described as oxides, which is the form in which they are presumed to exist in the completed glass articles of the invention, and which correctly account for the chemical elements and their proportions in the composition. The starting materials used to make the glass may be some other chemical compound than an oxide, such as barium carbonate, but the composition becomes modified to the oxide form during melting of the ingredients. Thus, the compositions of the glass articles of the present invention are discussed in terms of a theoretical oxide basis.

DETAILED DESCRIPTION

The components of the glass in compositions of the invention each generally contribute different properties or degrees of a property in proportion to their amount in the composition, and combine with one another to achieve the unique properties of glass articles of the present invention. For at least the components present in larger amounts, there is usually no sharp change in properties with small changes in proportions, and numerical ranges stated herein for such components should be understood in that context.

The components and amounts of each are chosen to provide compositions having good acid resistance, good crush strength, fluidity at the melting temperature, and a reasonable melting temperature (i.e., less than about 1450° C.). Preferably, the components and amounts of each are also chosen to provide compositions with low volatility at the temperatures of operation (i.e., less than about 0.5 wt-% loss to vaporization at the temperatures of operation), and low toxicity. Preferably, the glass compositions of the present invention require no fluidizing agents for improving fluidity in the melt during the manufacturing process. If fluidizing agents are used, however, they should not be volatile. Furthermore, they should not create hazardous compounds. Thus, metal fluorides are not used in the compositions of the present invention.

Silica ($SiO_2$) promotes glass formation and provides significant improvement in the acid-resistant characteristic of the compositions of the present invention. For the best acid resistance, at least about 25 wt-% $SiO_2$ is included. Too much silica, however, tends to make glass viscous and difficult to form the molten glass directly into spheres without the formation of excessive odd-shaped particles and fibers. Thus, the glass compositions of the present invention include no more than about 45 wt-% $SiO_2$. For particularly advantageous results, the silica level should preferably be about 30–35 wt-%.

The index of refraction of glass elements of the invention is generally increased with increasing proportions of $TiO_2$. At least about 20 wt-%, preferably about 20–35 wt-%, $TiO_2$ should be included to achieve the indices of refraction sought, e.g., about 1.6–1.9 and preferably about 1.75–1.85. At amounts above about 35 wt-%, the index of refraction is too high. At amounts below about 20 wt-%, the index of refraction is too low and meltability is poor. For particularly advantageous results, the $TiO_2$ level should preferably be about 25–35 wt-%.

An alkaline earth modifier, such as BaO or SrO (as a whole or partial substitute for BaO), is included to improve fluidity of the glass melt during formation of the glass and increases the refractive index of the glass. At least about 15 wt-%, and preferably no greater than about 40 wt-%, of BaO and/or SrO, is used in the compositions of the present invention. At amounts below about 15 wt-%, the composition is difficult to melt. At amounts above about 40 wt-% BaO, the acid resistance and crushing strength of the microspheres tends to fall below the levels sought. Thus, about 15–40 wt-% is preferably used in the compositions of the present invention, more preferably about 20–35 wt-%, and most preferably about 25–35 wt-%.

An alkali metal oxide, such as $Na_2O$ or $K_2O$ (as a whole or partial substitute for $Na_2O$), also promotes glass formation; however, too much makes the glass compositions have poor acid resistance. Greater than about 25 wt-% causes the glass articles of the present invention to be undesirable for pavement marking. Too little alkali metal oxide results in poor melting behavior. Thus, preferably the alkali metal oxide content is about 4–25 wt-%, and more preferably about 4–8 wt-%. In preferred embodiments, the alkali metal oxide is sodium oxide, rather than potassium oxide, because potassium oxide is more volatile than sodium oxide during typical glass melting operations.

Although glass compositions containing $SiO_2$, $TiO_2$, $Na_2O$ and/or $K_2O$, and BaO and/or SrO are known, not all are acid resistant. Furthermore, not all the compositions having the amounts disclosed herein are acid resistant. Thus, the glass articles of the present invention include $SiO_2$, $Na_2O$ and/or $K_2O$, and BaO and/or SrO in amounts such that the ratio of the amount of $SiO_2$ to the total amount of alkaline earth oxides (BaO and/or SrO) plus alkali metal oxides ($Na_2O$ and/or $K_2O$) is greater than about 0.7, preferably greater than about 0.8. Glass compositions containing these ratios of components have good acid resistance.

Boria ($B_2O_3$) provides improvement in the level of crushing strength and promotes glass formation; however, 5 wt-% or more $B_2O_3$ is undesirable. This is because too much $B_2O_3$ can cause manufacturing problems, such as poor melting behavior and phase separation. Preferably, no more than 1 wt-% $B_2O_3$ is included in the glass compositions of the present invention. In particularly preferred embodiments, the glass compositions are essentially free of $B_2O_3$.

Another desirable component of the glass compositions of the present invention is a rare-earth metal oxide, such as $La_2O_3$. Lanthanum oxide ($La_2O_3$), for example, promotes glass formation, aids in melting, and helps raise the refractive index while not deleteriously affecting the acid resistance or crush strength. If used, the compositions of the present invention include no more than about 10 wt-% $La_2O_3$, and preferably no more than about 5 wt-% $La_2O_3$. If $La_2O_3$ is present in the compositions of the present invention, preferably no more than about 1 wt-% $B_2O_3$ is used. More preferably, if $La_2O_3$ is present, the glass compositions are essentially free of $B_2O_3$.

As stated above, the glass compositions of the present invention are particularly advantageous because they do not require the use of fluidizing agents. Commonly used fluidizing agents are metal fluorides (e.g. NaF, LiF, $BaF_2$, KF), which can create hazardous emissions from the glass melt in the form of volatile HF and $SiF_4$. The presence of fluorine, a nonbridging anion, also promotes devitrification which limits the size of glass articles that can be prepared from the compositions of the present invention. Thus, the glass articles, e.g., microspheres, of the present invention are advantageous because they are acid resistant, they can be made in a wide variety of sizes, and they are made without metal fluoride fluidizing agents. They are also advantageous because they do not include toxic materials such as PbO.

Many other components can be included, either to contribute some specific property or to take the place of a portion of one of the other components. Generally, these other components do not total more than about 10 wt-%, preferably no more than about 5 wt-%, and more preferably no more than about 1 wt-%, of the composition (theoretical oxide basis). ZnO is an example of one possible additional component which can be added to provide meltability and fluidity to the glass melt; however, it also appears to reduce crushing strength and acid resistance. Thus, if ZnO is present, it is present in an amount of no more than about 10 wt-%, and preferably no more than about 5 wt-%. $Al_2O_3$ is also useful, generally in an amount of 1–5 wt-%, to contribute strength. Another useful component, although it is not desirable because of its toxicity, is $As_2O_3$, which can be added to make the glass elements colorless. Another component that can be included in the compositions, but is not desired, is CaO; however, this is preferably present in no more than about 5 wt-%.

Colorants can also be included in the composition of the present invention. Such colorants include, for example, $CeO_2$, $Fe_2O_3$, CoO, $Cr_2O_3$, NiO, CuO, $MnO_2$, and the like. Typically, the glass compositions of the present invention include no more than about 5 wt-%, preferably no more than about 1 wt-%, colorant, based on the total weight of the composition (theoretical oxide basis). Also, rare earth elements, such as europium, can be included for fluorescence.

The glass compositions of the present invention can also include oxides of elements that exist as impurities in certain starting materials. For example, $TiO_2$ can include impurities containing Al, Si, and K, which are incorporated into the glass. Typically, the glass compositions include no more than a total of about 5 wt-% of such impurities based on the total weight of the composition (theoretical oxide basis).

Glass articles of the invention can be prepared by conventional processes. In one useful process for making microspheres the starting materials are measured out in particulate form, each starting material being preferably about 0.01 and 50 micrometers in size, and intimately mixed together. They are then melted in a gas-fired or electrical furnace until all the starting materials are in liquid form. The liquid is then quenched in water, dried, and crushed to a size desired for the final microspheres. The microsphere can be screened to assure that they are in the proper range of sizes. The crushed microspheres are then passed through a flame having a temperature generally between about 1100° C. and 1450° C. to spheroidize the particles.

Alternatively, once the batch has been heated to the point where all starting materials are liquid, the liquid batch can be poured into a jet of high-velocity air. Glass microspheres of the desired size are formed directly in the resulting stream. The velocity of the air is adjusted in this method to cause a proportion of the microspheres formed to have the desired dimensions.

Previous teachings about microspheres have noted that for the best retroflection the microspheres should have good clarity, e.g., should contain no more than 5 wt-% scattered crystallinity and should be at least 95 wt-% bubble-free. However, while such a degree of clarity is preferred, it is not essential for satisfactory use of microspheres in pavement markings.

Microspheres of the invention can be incorporated into coating compositions (see, e.g., U.S. Pat. No. 3,410,185 (Harrington); U.S. Pat. No. 2,963,378 (Palmquist et al.); and U.S. Pat. No. 3,228,897 (Nellessen), which generally comprise a film-forming binding material in which the microspheres are dispersed. Alternatively, the microspheres can be used in drop-on applications for painted lines or incorporated into preformed retroreflective sheeting or tape. As taught, for example, in U.S. Pat. No. 2,354,018 (Heltzer et al.) or U.S. Pat. No. 3,915,771 (Gatzke et al.) tape useful for pavement markings generally comprises a backing, a layer of binder material, and a layer of microspheres partially embedded in the layer of binder material. The backing can be made from various materials, e.g., polymeric films, metal foils, and fiber-based sheets.

The glass microspheres of the present invention are particularly useful in pavement-marking sheet material as described in U.S. Pat. No. 4,248,932 (Tung et al.), and other retroreflective assemblies, such as those disclosed in U.S. Pat. Nos. 5,268,789 (Bradshaw), 5,310,278 (Kaczmarczik et al.), 5,286,682 (Jacobs et al.), and 5,227,221 (Hedblom).

Preferably, rather large microspheres, e.g., microspheres in excess of 250 micrometers in diameter, are used in "exposed-lens" pavement markings (i.e., with the microspheres partially embedded in, and partially protruding from and exposed above, the top layer of the marking) to provide the best retroreflective properties during precipitation and to minimize the effects of dirt collection. However, microspheres of the invention can be made and used in various sizes, although 200–600 micrometers is typically desired. It is difficult to deliberately form microspheres smaller than 10 micrometers in diameter, though a fraction of microspheres down to 2 or 3 micrometers in diameter is sometimes formed as a by-product of manufacturing larger microspheres. Generally, the uses for glass microspheres call for the microspheres to be less than about 2 millimeters in diameter, and most often less than about 1 millimeter in diameter.

Glass articles of the invention may be used in other shapes besides microspheres and for other purposes beside retroreflection. For example, they may be used as fibers or as flakes, and their high crush resistance and abrasion resistance adapts them to use for shot blasting or as mechanical plating media.

The invention is further illustrated by the following examples, but the particular materials and amounts thereof recited in these examples, as well as other conditions and details, should not be construed to unduly limit this invention.

EXAMPLES

Acid Resistance

Resistance to attack by acidic agents can be indicated by immersing a sample of glass microspheres in an excess of one volume percent concentrated sulfuric acid for 120 hours; then washing and drying the microspheres; and then visibly determining the percentage of microspheres that have been reduced in transparency. Different degrees of opacification are possible, from cloudy, to frosted, to separation of a thin outer shell of the microsphere from the rest of the microsphere. Microspheres that have been reduced in transparency stand out among the clear unaffected microspheres in a sample. The test is rather severe, but in a batch of microspheres of the present invention no more than about 20%, preferably no more than about 15%, and more preferably no more than about 5%, have reduced transparency.

Crush Resistance

Glass microspheres were formed and screened to sizes of about 100–200 micrometers. The crushing strength of the microspheres was measured in a bead-crushing machine, the major feature of which is two parallel plates made of very hard, non-deforming material (e.g., a ceramic, such as polycrystalline aluminum oxide). A single microsphere of known diameter was placed on the lower plate which was raised until the microsphere fails. Crushing strength is the force exerted on the microsphere at failure divided by the cross-sectional area of the microsphere ($\pi r^2$). Ten microspheres of a given composition were tested and the average result is reported as the crush resistance for the composition.

Index of Refraction

The Index of Refraction was measured by the Becke method, which is disclosed in F. Donald Bloss; "An Introduction to the Methods of Optical Crystallography"; Holt, Rinehart and Winston; New York; 47–55 (1961), the disclosure of which is incorporated herein by reference.

Example 1

1.8 Index White Beads

A glass batch was made by blending the following dry powders: 32 parts $SiO_2$, 31 parts $TiO_2$, 36.04 parts $BaCO_3$, 10.96 parts $NaNO_3$, 1.78 parts $H_3BO_3$ and 4 parts $La_2O_3$. This mixture will yield a glass composed of 32 wt-% $SiO_2$, 31 wt-% $TiO_2$, 28 wt-% $BaO$, 4 wt-% $Na_2O$, 1 wt-% $B_2O_3$ and 4 wt-% $La_2O_3$.

The raw materials were put in a platinum crucible and subsequently placed into a furnace which had been preheated to 1400°±50° C. The materials were observed to melt in less than about 7 minutes. The crucible was allowed to sit for a total of fifteen minutes inside the furnace at which point the crucible was removed and glass beads formed directly from the melt by pouring liquid glass directly into a stream of high velocity air (40 psi).

Glass microspheres were formed and screened to a size between 100 micrometers and 250 micrometers. These microspheres were subsequently tested for acid resistance as follows: a 0.3 g sample of beads (approximately 20,000 beads or so) was placed inside a glass vial to which about 20–30 ml of 1-volume percent concentrated $H_2SO_4$ was added. The mixture was allowed to sit for five days at room temperature at which point the acid was decanted and the beads were washed several times with deionized water and then allowed to dry, at which point they were observed under a microscope. For each sample, several fields of view, each containing several hundred microspheres, were examined. After this testing, the beads showed no signs of degradation or frosting (i.e., less than 5% displayed any frosting, haziness or clouding).

Crush strength was measured as described above and found to be 5065 kg/cm$^2$. The index of refraction was measured as described above to be 1.82.

Example 2

1.8 Index Yellow Beads

The glass batch described in Example 1 was prepared with the addition of 5 parts $CeO_2$. The glass was formed into beads as described above and the glass beads were observed to retroreflect yellow. The beads were tested for acid resistance as described above and no frosting or degradation was observed after testing.

Example 3–15 and Comparative Examples A & B

Additional glass compositions were prepared according to the method described in Example 1. The following table describes these compositions and their physical properties.

intended to encompass all such modifications within the scope of the appended claims.

What is claimed is:

1. A pavement marking tape comprising a backing and a layer of acid-resistant glass microspheres carried on the backing, said microspheres comprising, on a theoretical oxide basis:
    (a) about 25–45 wt-% $SiO_2$;
    (b) about 20–35 wt-% $TiO_2$;
    (c) less than about 5 wt-% $B_2O_3$;
    (d) about 15–40 wt-% of an alkaline earth modifier selected from the group consisting of BaO, SrO, and mixtures thereof; and
    (e) no greater than about 25 wt-% of an alkali metal oxide selected from the group consisting of $Na_2O$, $K_2O$, and mixtures thereof;
    wherein the ratio of amount of $SiO_2$ to the total amount of alkaline earth modifier plus alkali metal oxide is greater than about 0.7.

2. The tape of claim 1 wherein said microspheres further include no greater than about 10 wt-% $La_2O_3$.

3. The tape of claim 2 wherein said microspheres are essentially free of $B_2O_3$.

4. The tape of claim 1 wherein said microspheres have a crush resistance of at least about 3500 kilograms per square centimeter.

5. The tape of claim 1 comprising:
    (a) about 30–35 wt-% $SiO_2$;
    (b) about 25–35 wt-% of $TiO_2$; and
    (c) about 25–35 wt-% of the alkaline earth modifier.

6. The tape of claim 1 wherein said microspheres have a diameter of less than about 2 millimeters.

7. The tape of claim 6 wherein no more than about 15% of a sample of said microspheres have reduced transparency when exposed to 1 volume-% of concentrated $H_2SO_4$ for 120 hours.

| Example | SiO$_2$/(Alkali & Alkaline Earth) | SiO$_2$ | TiO$_2$ | BaO | Na$_2$O | K$_2$O | B$_2$O$_3$ | La$_2$O$_3$ | ZnO | Al$_2$O$_3$ | SrO | Acid Resistance (% Attacked) | Crush Strength (kg/cm$^2$) | Index |
|---|---|---|---|---|---|---|---|---|---|---|---|---|---|---|
| 3  | 0.71 | 25 | 34 | 30 | 4   | 1 | 2 | 4   | 0 | 0 | 0  | <5%  |      | 1.84–1.85 |
| 4  | 0.74 | 25 | 32 | 30 | 4   | 0 | 0 | 4   | 5 | 0 | 0  | <5%  | 5925 | 1.84–1.85 |
| 5  | 0.74 | 28 | 31 | 30 | 8   | 0 | 0 | 3   | 0 | 0 | 0  | <5%  | 5155 | 1.80–1.81 |
| 6  | 1.29 | 45 | 20 | 15 | 20  | 0 | 0 | 0   | 0 | 0 | 0  | <5%  | 6462 | 1.64–1.65 |
| 7  | 1.00 | 40 | 20 | 30 | 10  | 0 | 0 | 0   | 0 | 0 | 0  | <5%  | 7458 | 1.69–1.70 |
| 8  | 1.05 | 40 | 20 | 30 | 8   | 0 | 0 | 2   | 0 | 0 | 0  | <5%  | 7618 | 1.80–1.81 |
| 9  | 0.75 | 30 | 30 | 37 | 3   | 0 | 0 | 0   | 0 | 0 | 0  | 15%  | 6395 | 1.80–1.81 |
| 10 | 1.00 | 32 | 31 | 0  | 4   | 0 | 1 | 4   | 0 | 0 | 28 | <5%  | 6280 | 1.80–1.81 |
| 11 | 1.00 | 32 | 31 | 10 | 4   | 0 | 1 | 4   | 0 | 0 | 18 | 40%  | 7466 | 1.78–1.79 |
| 12 | 0.69 | 25 | 30 | 30 | 6   | 0 | 0 | 4   | 0 | 5 | 0  | <5%  | 7262 | 1.81–1.82 |
| 13 | 1.00 | 40 | 20 | 20 | 20  | 0 | 0 | 0   | 0 | 0 | 0  | <5%  | 6701 | 1.65–1.66 |
| 14 | 1.14 | 32 | 31 | 28 | 0   | 0 | 1 | 8   | 0 | 0 | 0  | 10%  | 6701 | 1.78–1.79 |
| 15 | 0.82 | 30 | 33 | 30 | 6.5 | 0 | 0 | 0.5 | 0 | 0 | 0  | <5%  | 6863 | 1.81–1.82 |
| Comparative Examples | | | | | | | | | | | | | | |
| A | 0.60 | 25 | 30 | 30 | 12 | 0 | 0 | 3 | 0 | 0 | 0 | <50% | | |
| B | 0.60 | 25 | 33 | 25 | 17 | 0 | 0 | 0 | 0 | 0 | 0 | >50% | | |

The complete disclosures of all patents, patent documents, and publications, are incorporated herein by reference as if individually incorporated. It will be appreciated by those skilled in the art that various modifications can be made to the above described embodiments of the invention without departing from the essential nature thereof. The invention is 8. The pavement marking tape of claim 1 wherein the acid-resistant microspheres have an index of refraction of about 1.6–1.9.

9. The pavement marking tape of claim 1 wherein the acid-resistant microspheres have an index of refraction of about 1.75–1.85.

10. The tape of claim 1 wherein said microspheres further comprise a colorant.

11. A pavement marking tape comprising a backing and a layer of acid-resistant glass microspheres carried on the backing, said microspheres comprising, on a theoretical oxide basis:
  (a) about 30–35 wt-% $SiO_2$;
  (b) about 25–35 wt-% $TiO_2$;
  (c) less than about 1 wt-% $B_2O_3$;
  (d) about 25–35 wt-% of an alkaline earth modifier selected from the group consisting of BaO, SrO, and mixtures thereof; and
  (e) about 4–25 wt-% of an alkali-metal oxide selected from the group consisting of $Na_2O$, $K_2O$, and mixtures thereof;
  wherein the ratio of the amount of $SiO_2$ to the total amount of alkaline earth modifier plus alkali metal oxide is greater than about 0.7.

12. The tape of claim 11 wherein said microspheres comprise no greater than about 10 wt-% $La_2O_3$.

13. The tape of claim 12 wherein said microspheres are essentially free of $B_2O_3$.

14. The tape of claim 11 wherein said microspheres have an index of refraction of about 1.75–1.85.

15. The tape of claim 11 wherein said microspheres comprise about 4–8,wt-% $Na_2O$.

16. The tape of claim 10 wherein said microspheres further comprise a colorant.

17. A pavement marking tape comprising a backing and a layer of acid-resistant glass microspheres carried on a backing, said microspheres consisting essentially of, on a theoretical oxide basis:
  (a) about 25–45 wt-% $SiO_2$;
  (b) about 20–35 wt-% $TiO_2$;
  (c) less than about 5 wt-% $B_2O_3$;
  (d) about 20–40 wt-% of an alkaline earth modifier selected from the group consisting of BaO, SrO, and mixtures thereof;
  (e) about 4–25 wt-% of an alkali metal oxide selected from the group consisting of $Na_2O$, $K_2O$, and mixtures thereof; and
  (f) no greater than about 10 wt-% $La_2O_3$;
  wherein the ratio of the amount of $SiO_2$ to the total amount of alkaline earth modifier plus alkali metal oxide is greater than about 0.7.

18. The tape of claim 17 wherein said microspheres consist essentially of:
  (a) about 30–35 wt-% $SiO_2$;
  (b) about 25–35 wt-% $TiO_2$;
  (c) less than about 1 wt-% $B_2O_3$;
  (d) about 25–35 wt-% of the alkaline earth modifier;
  (e) about 4–8 wt-% $Na_2O$; and
  (f) no greater than about 10 wt-% $La_2O_3$.

19. The tape of claim 17 wherein said microspheres further comprise a colorant.

* * * * *

UNITED STATES PATENT AND TRADEMARK OFFICE
CERTIFICATE OF CORRECTION

PATENT NO. : 5,853,851
DATED : December 29, 1998
INVENTOR(S) : Geoffrey P. Morris, White Bear Lake, Minn.

It is certified that error appears in the above-identified patent and that said Letters Patent is hereby corrected as shown below:

In Column 6, line 59 "La2O$_3$" should be -- La$_2$O$_3$ --

In Column 9, line 28 "claim 10" should be -- claim 11 --

Signed and Sealed this

Eighteenth Day of May, 1999

Attest:

Q. TODD DICKINSON

*Attesting Officer*   Acting Commissioner of Patents and Trademarks